Feb. 16, 1943.  J. B. BRENNAN ET AL  2,310,932
ELECTROLYTIC DEVICE
Filed Nov. 30, 1938
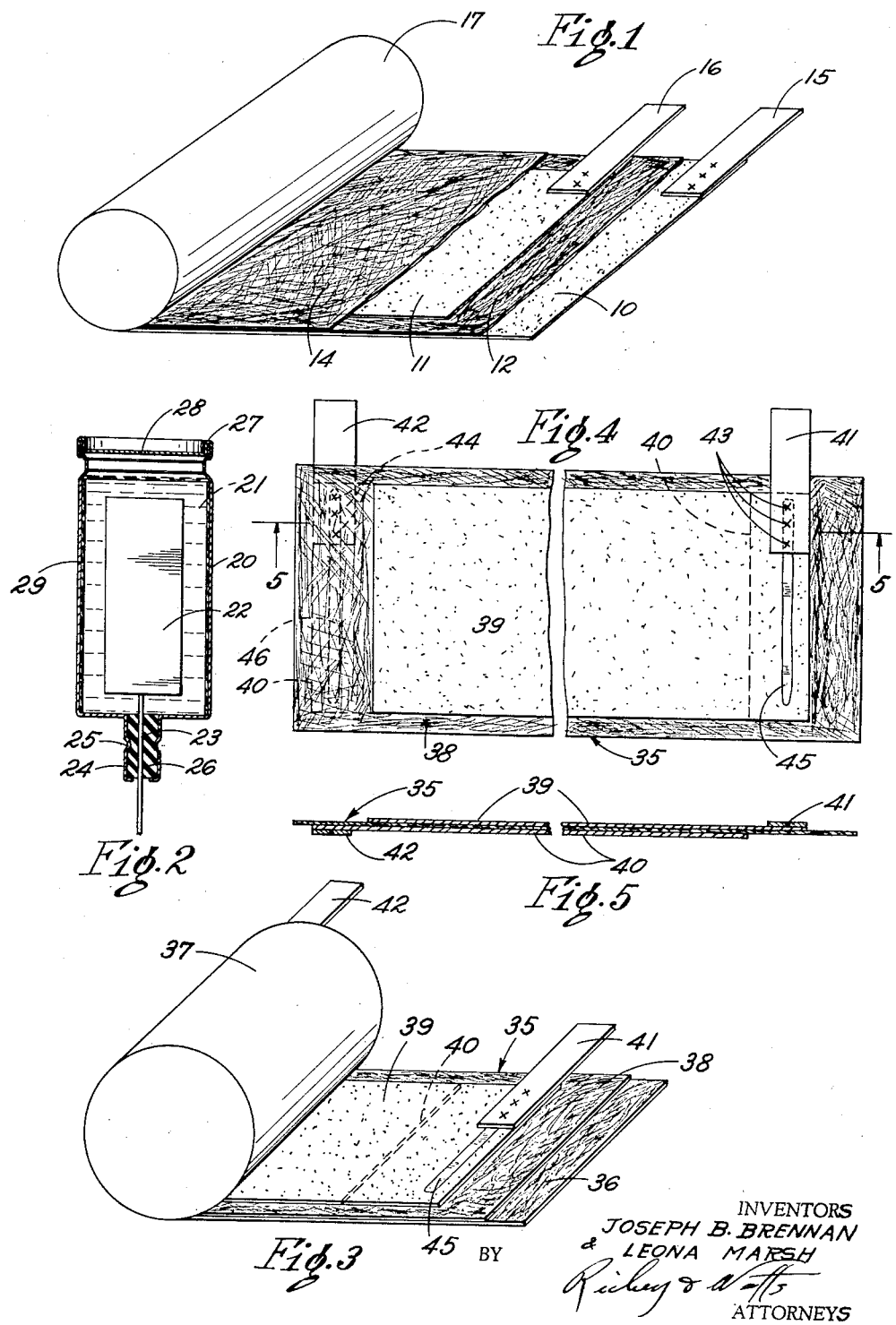
INVENTORS
JOSEPH B. BRENNAN
& LEONA MARSH
BY
ATTORNEYS Patented Feb. 16, 1943

2,310,932

UNITED STATES PATENT OFFICE 2,310,932

ELECTROLYTIC DEVICE

Joseph B. Brennan and Leona Marsh, Euclid, Ohio; said Marsh assignor to said Brennan Application November 30, 1938, Serial No. 243,206

5 Claims. (Cl. 175—315)

This invention relates to devices such as electrolytic condensers, rectifiers, lightning arrestors and the like and more particularly relates to spacers for separating the electrodes or plates of such devices. Insofar as the common subject matter is concerned this application is a continuation in part of our copending application Serial No. 67,934, filed March 9, 1936.

Spacers for electrolytic condensers should be sufficiently porous and absorptive to retain the electrolyte between the plates or electrodes and to permit free flow of ions through the electrolyte. Further the spacers should be harmless to the electrolyte so that they will not contaminate it and thus impair the efficiency of the device. They should have high dielectric strength and be resistant to heat and should not be adversely affected by the temperatures attained in the operation of the device and should be of high dielectric strength. Further the spacer should be of materials which will not mechanically injure or scratch the electrode plates. It is among the objects of our invention to provide a spacer embodying the desirable characteristics noted above, to provide such a spacer which can be economically produced, and to provide economical and efficient methods of making such spacers. It is also an object of our invention to provide a unitary spacer and electrode assembly and a method of making such assemblies. A further object is to provide efficient, durable and economical condensers and similar devices embodying such spacers and assemblies.

We have found that the above and other objects and advantages can be attained by employing a spacer composed of glass filaments or fibers of certain rather definite characteristics woven into a cloth, or preferably formed into a mat. It has previously been proposed to employ ordinary glass wool or cloth composed of coarse fibers having diameters of 0.001" or greater. Spacers composed of ordinary glass wool do not give satisfactory results in electrolytic condensers for various reasons; for example, the relatively coarse fibers punctured the dielectric film on the anodes of the condensers resulting in high leakage losses, and inefficient operation. We have found that this difficulty can be eliminated by employing filaments or fibers having diameters of not greater than 0.0005", and we preferably employ a glass fabric, either woven or matted, formed of filaments having a diameter of about 0.0002" or less. These fibers are extremely flexible and almost silk-like in their characteristics with the result that they do not injure the dielectric films of the electrodes in which they are in contact.

Due to the fineness of the filaments, the area of the filaments in a glass fabric is tremendously increased as compared to the area of the filaments composed in a glass fabric made of coarser material such as ordinary glass wool. This increase in the area of glass exposed to the electrolyte results in a material that is more chemically reactive to the electrolyte as well as being more susceptible to the effect of heat. For these reasons we found that in order to obtain the best results it is preferable to employ a glass fabric made of fine filaments of a glass which will withstand high temperatures, and which contains no ingredients which will contaminate the electrolyte. We have found that filaments made of a high melting point glass, such as a glass composed of oxides of silicon with oxides of boron, magnesium and aluminum are very satisfactory from the standpoint of resistance to heat. Further the glass should be as free as possible from substances such as iron or lead which would be detrimental to the condenser, inasmuch as no material is completely inert or non-reactive during electrolysis over a long period. Therefore, we preferably employ glass fabrics made of glass filaments substantially free from lead and iron, and of a high melting point glass consisting principally of oxides of silicon, boron, magnesium, and aluminum. The glass is preferably of such composition that, even in the form of fine filaments, it has a melting point of 300° C. or higher. Such glass will withstand without any apparent damage the highest operating temperatures ordinarily encountered in electrolytic condensers; i. e. temperatures of about 150° C. Such fabrics, particularly in the form of a thin felted or matted arrangement of the filaments, produce excellent results as spacers for electrolytic condensers, and because of the flexibility and strength of the fine glass filaments, such spacers can be readily incorporated in electrolytic condensers of either the wet or dry type.

As stated above we may employ either woven glass fabrics or matted or felted glass fabrics in condensers of either wet or dry types. However we preferably employ glass fabric mats, for the reason that the matted fabric is of substantially uniform thickness and porosity throughout its area, whereas the woven fabrics are necessarily of greater porosity in the regions of the voids between the threads than in the regions of the threads. Further where the threads cross each other there are small areas in which the porosity is greatly reduced and the thickness increased. Because of the uniform porosity and thickness of the glass fabric mats the electrode plates of the condenser can be closely and accurately spaced and, especially in dry types of condensers, the entire area of the plates can be utilized more efficiently than in condensers where woven or stranded spacers of glass or of other materials such as cotton gauze are employed.

In the manufacture of fine glass filaments, the glass while in a viscous condition is drawn into fine fibers or filaments by a blast of steam or gas under pressure. In the case of glass mats the mats are produced by the Fourdrinier process and the individual filaments ordinarily have a length of from approximately 10 to 12 inches. In the production of woven fabrics of glass filaments the fine filaments are collected and spun into threads and then may be woven into cloth, the filaments in the case of the woven fabric being continuous and in some instances being many yards long. As continuous filaments of great length are not required in the production of the glass mats the individual fibers can be drawn to a smaller diameter, when intended for use in mats, than the filaments produced for weaving processes.

In the production of glass fabrics, a lubricant or sizing material is sometimes employed to facilitate the handling of the filaments. For this reason, it is desirable to wash the woven fabrics or mats before incorporating them in condensers. This may preferably be accomplished by cleaning in a dilute solution of borax, rinsing in distilled water, then cleaning again in a hot boric acid solution and finally rinsing in a distilled water to remove any traces of the acid. Thereafter, if desired, the woven fabrics or mats may be treated to increase their strength, and their resistance to the action of the electrolyte by an application of a sizing material which will not be deleterious to the condenser when in use. For example water glass, or materials such as latex, lacquers, Bakelite resins or varnishes or condensation products of the urea formaldehyde type may be employed. Only sufficient sizing material to prevent undue slipping of the filaments with respect to each other and to slightly increase the rigidity and strength of the material should be employed.

Glass fiber mats or woven fabrics formed of glass filaments having the composition noted above and preferably treated as previously described may be incorporated as spacers in electric devices of various types. Electrolytic condensers incorporating such spacers have very desirable features in that the power factor and resistance losses are materially reduced and the durability and serviceability of the condensers are greatly improved as compared to condensers embodying prior types of spacers. More particularly, electrolytic condensers embodying our spacers are very much better able to withstand surge voltages than prior types of condensers.

Referring to the drawing, Figure 1 illustrates a condenser of the dry or paste type incorporating a preferred form of our spacer; Figure 2 shows a wet type of condenser embodying a preferred form of spacer; Figure 3 illustrates a modified form of paste type of condenser embodying a unitary electrode and spacer assembly; Figure 4 is a plan view of the electrode and spacer assembly of the condenser of Figure 3; Figure 5 is a section taken from along the line 5—5 of Figure 4.

In Figure 1 of the drawing we have illustrated our spacer as applied to a dry type condenser comprising electrode plates 10 and 11 separated by glass mats 12 and 14 constituting the spacers for preventing contact between the electrodes and for retaining the electrolyte between the electrodes. The terminals for connecting electrode plates or foils 10 and 11 to an external circuit may comprise tabs 15 and 16 secured to the electrode foils by riveting, welding or any other convenient method. The whole assembly may be rolled into cylindrical form as indicated at 17 and may be impregnated with a suitable electrolyte, either before or after rolling, in accordance with the methods known to those skilled in the art.

Depending upon the service for which the condenser is intended, one or both of the electrode foils 10 and 11 may be made of aluminum or other film forming material and may be provided with a dielectric film. Various viscous or pasty electrolytes may be employed with the condenser, however we prefer to employ the paste type of electrolyte described in our prior Patent No. 2,095,966 as this electrolyte, which includes a partially reacted condensation product of the urea formaldehyde type, produces a condenser of high efficiency and does not react deleteriously with the spacer material.

The spacers preferably are of the glass mat type of fabric described above. We have found that very satisfactory results can be obtained by employing glass mats formed of fibers of from about 10 to 12 inches in length, the individual fibers or filaments having a diameter of about 0.0002" or less and the thickness of the mat being from about 0.002" to 0.005". Before incorporating the mat in the condenser the material is washed as previously described and then preferably sized, the preferred sizing material being a condensation product of urea and formaldehyde if a urea-formaldehyde electrolyte is to be employed in the condenser.

As shown in Figure 2 our spacer may readily be adapted to condensers of the wet type. For example, such a condenser may comprise a container 20 of aluminum or other metal which functions to retain the liquid electrolyte 21 and also constitutes the cathode of the condenser. An anode 22 formed of aluminum or other film forming metal and provided with a dielectric film may be supported within the container by a terminal or riser 23 extending through the depending neck portion 24, the neck being deformed inwardly as at 25 to compress the rubber grommet 26 against the riser and to seal the neck against the passage of fluid. The upper portion of the container may be closed by a cap 27 having any suitable vent 28 incorporated therein to permit the escape of gases which may be generated during the operation of the condenser.

To prevent accidental contact between the anode and the cathode container we employ a spacer 29 consisting of a piece of glass fabric, preferably of the matted or felted type, bent into cylindrical form to fit within the container closely adjacent the inner walls thereof. The spacer of glass fabric will effectively prevent short circuiting between the anode and the cathode container, while allowing a free circulation of electrolyte and flow of ions therethrough. In order to give the spacer sufficient strength and rigidity to enable it to support itself in position within the container the spacer is preferably impregnated with one of the various sizing and stiffening materials noted above. A sizing material particularly suitable for this purpose consists of a Bakelite resin or varnish which may be applied by spraying, or dipping the fabric in a thin solution of the material and thereafter baking the material to harden it.

Spacers made according to our invention not only can function to separate the foil electrodes of electrolytic condensers but also our spacers can function as a support for electrodes having surfaces of sprayed metal such as those described in United States Letters Patent No. 2,104,018 and in the copending application of Joseph B. Brennan, Ser. No. 227,316, filed August 29, 1938.

As described in the aforesaid patent and application electrodes having sprayed metal surfaces are highly advantageous when used as cathodes or filmed anodes in electrolytic condensers. The advantages flow principally from the greatly increased effective area of the electrodes in contact with the electrolyte, which results in increased efficiency in condensers embodying such electrodes and a greatly increased capacity per unit of plain area of the filmed anodes. We have found that the spacer construction described herein is particularly adapted for use in connection with electrodes having sprayed surfaces, for a complete electrode and spacer assembly can be made by spraying a layer of metal on one side of the spacer material to constitute the anode of the condenser, and spraying a layer on the other side of the material to constitute the cathode of the condenser. For use as a combined electrode support or base and spacer we preferably employ a matted glass fabric having a thickness of at least 0.004 inch. Such fabrics can be sprayed with molten metal on both sides without there being electrical contact between the layers on the opposite side. When incorporated in condensers such electrode and spacer assemblies can be readily impregnated with the electrolyte and produce condensers of extremely desirable characteristics because of the fact that the electrode plates are closely spaced, yet are effectively separated by a spacer of high dielectric strength, and because the electrodes themselves have an effective area many times greater than their plane or directly measurable area.

A dry type condenser embodying such an electrode and spacer assembly is illustrated in Figures 3, 4 and 5. As shown in Figure 3 the condenser in general appearance may be similar to that illustrated in Figure 1 and may consist of the electrode and spacer assembly 35 which is rolled up with a plain unsprayed glass spacer 36 into cylindrical form as indicated at 37. The electrode and spacer assembly 35 is illustrated in greater detail in Figures 4 and 5, and may comprise a strip 38 of matted glass fabric having metallic layers 39 and 40 sprayed on opposite sides thereof. If desired the opposite sides of the fabric may be sprayed simultaneously by means of two spray guns. Preferably both layers consist of finely divided particles of aluminum which cohere to each other and adhere to the base to form layers conductive throughout their entire area. However other filming materials may be employed if desired or, if desired, the cathode of a condenser intended for direct current service need not be of film forming metal, but may be of copper or other non-filming metal. If the condenser is intended for alternating current service both electrodes should be of film forming metal and both electrodes should be provided with dielectric films.

The sprayed surfaces 39 and 40 are provided with terminals 41 and 42, respectively, for connecting the electrode plates to external circuits. It will be noted that the terminals are disposed at opposite ends of the strip 38 and that the sprayed areas 39 and 40 are slightly offset with respect to each other. This construction is preferred in order to eliminate the possibility of short circuits being produced between the terminals or at the ends of the sprayed areas. Furthermore with this type of construction it is possible to weld the terminals to the sprayed areas as diagrammatically indicated at 43 and 44 and if desired to provide the end portions of the sprayed areas with conductive paths 45 and 46 by fusing the particles in such paths into more compact masses. The method of forming such paths and of welding the terminals to the sprayed surfaces is described in greater detail in the above noted application of Joseph B. Brennan.

To carry out the forming operation the electrode and spacer assembly may be immersed in any ordinary film forming electrolyte, such as a solution of borax and boric acid. If both plates are to be provided with dielectric films, as in a condenser intended for alternating current service, then both terminals are connected to the positive terminal of a source of electro-motive force and both sprayed areas are subjected to electrolysis as anodes until the leakage current is reduced to the desired value at the specified forming voltage. If the condenser is intended for direct current service only one electrode is required to be provided with a dielectric film. In preparing an electrode for such service only one terminal, for instance the terminal 41 for the sprayed surface 39, would be connected to the source of electro-motive source and thus the dielectric film would only be formed on the surfaces of the particles making up the sprayed area 39.

Our woven or matted grass fabric spacers can be advantageously employed in condensers of the electrostatic type. Such condensers may be made, for example, in the forms illustrated in Figures 1, 3, 4 and 5 of the drawing. In such condensers, however, it is unnecessary to employ filmed electrodes or a film maintaining electrolyte. The electrodes or plates may be separated only by the glass, or if desired, the glass fabric may be impregnated with a dielectric material, for example, a transformer oil of high dielectric strength.

Glass fabric, either woven or matted, made up of filaments of the small diameter specified herein, is very flexible and can be bent sharply without breaking about radii of ¼ inch or less. Glass fabric sprayed with aluminum retains its flexibility to such an extent that it can be readily handled and formed into shapes suitable for incorporating in electrolytic condensers of various types. Because of the uniform characteristics of the glass fabric, its chemical inertness, its resistance to high temperatures, its high dielectric strength and its flexibility and mechanical strength, separators made according to our invention are superior to anything heretofore known. Our device can not only be employed as a separator, but may be employed both as a separator and as a support for the sprayed metallic areas constituting electrodes of electrolytic devices. Because of the advantages and improved characteristics of glass spacers, condensers incorporating such spacers are extremely durable, have lower leakage, power factor, and resistance losses and operate with a higher degree of efficiency over long periods of time than prior types of condensers.

In the foregoing specification we have described a preferred form of our invention as applied to electrolytic condensers. It will be obvious to those skilled in the art that our spacer has applications to other types of electrolytic devices and that the various modifications may be made without departing from the spirit and scope of our invention. It is, therefore, to be understood that the foregoing description is given by way of example only and that our patent is not limited to the preferred forms described herein or in any manner other than by the scope of the appended claims when given the range of equivalents to which our invention may be entitled.

We claim:

1. A spacer and electrode assembly for electrolytic cells comprising a unitary porous glass fabric having spray deposited metallic coatings on opposite sides thereof, said spray deposited coatings each constituting an electrode and being separated and insulated from each other by said glass fabric, at least one of said coatings consisting of film forming metal and having a dielectric film formed on the surfaces of the spray deposited particles.

2. A spacer and electrode assembly for electrolytic cells comprising a unitary, thin, porous, flexible base of insulating material having spray deposited metallic coatings on opposite sides thereof, said spray deposited coatings each constituting an electrode and being separated and insulated from each other by said base.

3. A spacer and plate assembly for condensers comprising a unitary porous glass fabric having spray deposited metallic coatings on opposite sides thereof, said spray deposited coatings being separated and insulated from each other by said glass fabric.

4. A spacer and electrode assembly for electrolytic condensers comprising a unitary porous glass fabric having spray deposited conductive metallic coatings on opposite sides thereof, said spray deposited coatings each constituting an electrode and being separated and insulated from each other by said glass fabric, at least one of said coatings consisting of film-forming metal and having a dielectric film formed on the surfaces of the spray deposited particles, said glass fabric being composed of glass filaments having a diameter of less than 0.0005" and being formed from high melting point glass which is substantially free from iron and lead and consists principally of oxides of silicon, boron, magnesium and aluminum.

5. A spacer and electrode assembly for electrolytic cells comprising a unitary thin porous base of insulating material having porous conductive coatings composed of minute cohering particles of metal on opposite sides thereof, said coatings each constituting an electrode and being separated and insulated from each other by said base.

JOSEPH B. BRENNAN.
LEONA MARSH.